United States Patent [19]

Baile et al.

[11] 3,860,723

[45] Jan. 14, 1975

[54] METHODS AND COMPOSITIONS FOR INCREASING FEED INTAKE OF ANIMALS

[75] Inventors: Clifton A. Baile, Glen Mills; Carol Lynn McLaughlin, Malvern; Robert Lee Webb, West Chester, all of Pa.

[73] Assignee: SmithKline Corporation, Philadelphia, Pa.

[22] Filed: Aug. 7, 1973

[21] Appl. No.: 386,462

Related U.S. Application Data

[63] Continuation-in-part of Ser. No. 224,987, Feb. 9, 1972, abandoned.

[52] U.S. Cl. .................................. 424/321, 424/322
[51] Int. Cl. ............................................. A61k 27/00
[58] Field of Search ............. 424/321, 322; 224/987

[56] References Cited
UNITED STATES PATENTS

| | | | |
|---|---|---|---|
| 3,068,283 | 12/1962 | Kaiser | 260/553 |
| 3,143,549 | 8/1964 | Lafferty et al. | 260/268 |
| 3,266,987 | 8/1966 | Crowley et al. | 424/322 |
| 3,316,151 | 4/1967 | Green et al. | 424/322 |
| 3,509,211 | 4/1970 | Ilvespaa et al. | 260/556 |
| 3,659,012 | 4/1972 | Porter et al. | 424/322 |

Primary Examiner—Frederick E. Waddell
Attorney, Agent, or Firm—Joseph A. Marlino; Richard D. Foggio; Wiiliam H. Edgerton

[57] ABSTRACT

Methods and compositions utilizing phenylalkylsulfamide and phenylakylurea derivatives which increase feed intake of healthy animals, particularly ruminants. The preferred compounds to be used as active ingredients are phenylalkylsulfamides, such as, for example, N-[1-methyl-2-(3-trifluoromethylphenyl)ethyl]sulfamide.

9 Claims, No Drawings

METHODS AND COMPOSITIONS FOR INCREASING FEED INTAKE OF ANIMALS

This application is a continuation-in-part of copending Ser. No. 224,987, filed Feb. 9, 1972 now abandoned.

This invention relates to animal feed compositions and to a novel method of increasing feed intake of healthy animals by administering these compositions to the disease-free animals. More specifically, this invention relates to a method of increasing feed intake in animals not in need of therapeutic treatment by administering internally the active ingredient, a phenylalkylsulfamide or phenylalkylurea as such or in a standard premix in the feed of the animals.

Increasing the feed intake in healthy animals, particularly ruminants, is an important commercial objective. Sheep and cattle are fed for maximum growth rate in feed lots until they reach a marketable weight. When the desired weight is achieved, the animal is sold for slaughter. There is a normal feed intake for most animals due to both physical and metabolic factors. Presumably, animals become satiated and therefore will no longer feed voluntarily.

It has been unexpectedly found that when certain phenylalkylsulfamide and phenylalkylurea derivatives are administered to healthy animals, they eat more and gain weight at a faster rate resulting in better efficiency.

The compositions and methods of this invention definitely benefit the economics of animal production by inducing the animals to eat more than their normal feed intake. The animals eat more, gain weight more rapidly, and get to market faster resulting in a saving of feed cost and labor.

The increased feed intake and weight gain of animals is accomplished in accordance with this invention by a method which comprises administering internally to the healthy animal a compound of the following basic structural formula:

FORMULA 1

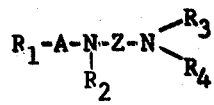

in which:
- $R_1$ represents phenyl, halophenyl, nitrophenyl, or trifluoromethylphenyl;
- A represents lower alkylene having 2 to 4 carbon atoms;
- $R_2$, $R_3$, and $R_4$ represent hydrogen or lower alkyl; and
- Z represents $SO_2$ or CO functional groups.

By the term lower alkyl used herein is meant groups having from 1 to 6 carbon atoms, preferably from 1 to 4 carbon atoms. Where the alkylene chain A is branched and can form isomeric compounds, it is understood that the racemic mixtures or the individual isomers separated by conventional chemical techniques can be equivalently used.

The above compounds of Formula 1 which are the active ingredients in the claimed methods and compositions for increasing feed intake are known and prepared by synthetic methods familiar to the art, as for example, set forth in U.S. Pat. No. 3,143,549. Most useful is a simple reaction of a phenylalkylamine with sulfamide;

PROCEDURE I

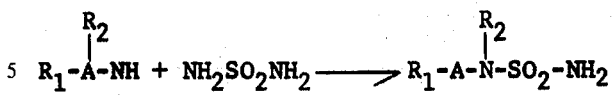

The terms A, $R_1$ and $R_2$ are as defined above.

PROCEDURE II

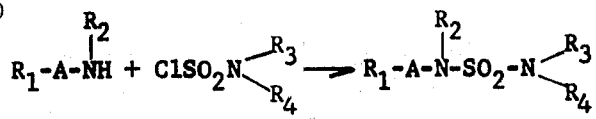

According to Procedure II, a phenylalkylamine is reacted with a di-lower alkylsulfamoyl chloride. The terms A, $R_1$, $R_2$, $R_3$, and $R_4$ are defined above.

Similarly the phenylalkylureas of this invention are prepared by reacting a phenylalkylamine with the appropriate carbamyl chloride derivative as described in U.S. Pat. No. 3,068,283.

The above compounds of Formula 1 can be administered to the animals intramuscularly or subcutaneously in the form of solutions for injection or preferably pellet implants, or the compounds can be mixed with conventional animal feed compositions. The feed compositions are then fed to ruminant or monogastric animals, according to methods well known to the agricultural art. The compounds are particularly advantageous when incorporated into the animal feeds. Preferably the compounds are incorporated into ruminant feeds.

The animal feeds most generally used in conjunction with the method of this invention are either various grain mixtures and/or roughage feeds such as hay commonly fed to ruminant animals such as cattle or sheep. The amount of additive used to supplement such feeds will be in an amount sufficient to increase feed intake and/or improve the feed efficiency of the animal but not to have a toxic or noxious effect; in the broad range of from about 10 g. to 1 kg. per ton of feed, preferably from about 25 g. to about 300 g./ton. An average sheep will ingest about 3–4 lbs. of feed daily; an average feed lot steer about 20–25 lbs. Therefore, the preferable broad range of dosage for ruminants by any method of internal administration is approximately 25 mg. to 5 g. per day.

For commercial use, the active ingredients can be readily used as premix formulations in which the chemical is distributed uniformly throughout a standard animal feed carrier. This premix or concentrate is then mixed with a normal diet for the animal desired. Examples of such carriers are soybean meal, corn oil, ground corn, barley, wheat, mineral mixtures such as vermiculite, diatomaceous earth, corn gluten meal, corn distillers solubles or soyflour. The active ingredient will be in amounts to satisfy the criteria set forth above for whole feed. The active ingredient will usually be present in from about 1–75% by weight of the premix composition.

The animal feeds themselves may also contain: roughages such as cellulose, hay, straw, silages, corn stalks, cotton seed hulls, oats, barley and cereal brans; natural oils such as animal fats, fish oils, safflower oil, peanut oil, and cottonseed oil; antioxidants, minerals, vitamins, antibiotics, anthelmintics; and other appropriate medicaments.

Examples of typical prepared animal feed is as follows:

EXAMPLE 1

| Ingredients | Weight per cent | |
|---|---|---|
| Mixed hay | 40.0 | |
| Ground yellow corn | 45.0 | |
| Soybean oil meal | 7.0 | |
| Cane molasses | 7.0 | |
| Dicalcium phosphate | 0.5 | |
| Trace minerals salt | .5 | |
| Vitamin A | 300 | I.U./lb. |
| Vitamin D | 150 | I.U./lb. |
| N-[1-Methyl-2-(3-trifluoromethylphenyl)ethyl]sulfamide | 0.4 | lb./ton of feed |

EXAMPLE 2

An example of a suitable premix is as follows:

| | |
|---|---|
| N-(1,2-Dimethyl-2-phenylethyl)sulfamide | 1 lb. |
| Ground yellow corn | to 10 lbs. |

EXAMPLE 3

In the field the active ingredients may be administered by means of salt or molasses blocks. A typical block may be prepared using the following conditions:

| Ingredients | Weight per cent |
|---|---|
| Dried cane molasses | 44.54 |
| Ground soybean hulls | 24.90 |
| 1-(3-trifluoromethylphenyl)-2-ureidopropane | 5.00 |
| Granulated salt | 21.59 |
| Trace minerals and vitamins | 0.20 |
| Stabilized animal fat | 1.11 |
| Moisture | 2.66 |

EXAMPLE 4 — Cattle Diet

| Ingredients | Weight per cent | |
|---|---|---|
| Ground shelled corn | 65.85 | |
| Mixed ground hay | 20.00 | |
| Dried molasses | 6.00 | |
| Soybean meal | 6.00 | |
| N-[-1,2-Dimethyl-2-(3-trifluoromethylphenyl)ethyl]sulfamide | 0.5 | lb./ton feed |
| Urea | .55 | |
| Trace mineral salt | .50 | |
| Dicalcium phosphate | .40 | |
| Ground limestone | .70 | |
| Vitamin A (30,000 units/gms.) | 66.7 | gm./ton |
| Vitamin $D_2$ (16,000,000 units/lb.) | 7.1 | gm./ton |

The method of this invention comprises allowing the cattle or sheep to graze or be fed ad libitum on the supplemented rations or to be fed on a regular schedule.

EXAMPLE 5 — Implant Pellets

| Ingredients | Amount |
|---|---|
| N-[1-Methyl-2-(3-trifluoromethylphenyl)ethyl]sulfamide | 50 mg. |
| Calcium sulfate, dihydrate | 20 mg. |
| Gelatin | 4 mg. |
| Magnesium stearate | 1 mg. |
| Talc | 2 mg. |

The sulfamide and calcium sulfate, dihydrate are mixed and passed through a No. 40 standard mesh screen. The screened mixture is then granulated with hot 15% gelatin solution, screened through a No. 10 mesh screen and dried overnight at 120° F. The granules are again screened through a No. 40 mesh screen and mixed with the magnesium stearate and talc. The granules are compressed into implants using a ⅛ inch flat face punch and die. One implant is administered intramuscularly.

Using the methods and compositions as described above, the following compounds can be used as active ingredients:

Phenethylsulfamide
2-phenylbutylsulfamide
4-chlorophenethylsulfamide
Phenethylcarbamide
N-(1-methyl-2-phenylethyl)carbamide
4-bromophenethylsulfamide
4-fluorophenethylsulfamide
4-trifluoromethylphenethylsulfamide
N-phenethyl-N-N',N'-trimethylsulfamide
N-methyl-N-phenethylsulfamide
N-phenethyl-N,N'-dimethylsulfamide
N'-methyl-N-phenethylsulfamide
N-ethyl-N-phenethylsulfamide
N-phenethyl-N,N'-diethylsulfamide
N-[1-methyl-2-(3-chlorophenyl)ethyl]sulfamide
N-[1-methyl-2-(3-fluorophenyl)ethyl]sulfamide
N-[1,2-dimethyl-2-(3-trifluoromethylphenyl)ethyl]-sulfamide
N-(1-methyl-2-phenylethyl)sulfamide
N-(1-methyl-2-phenylethyl)-N',N'-dimethyl-sulfamide
N-[1-ethyl-2-(3-trifluoromethylphenyl)ethyl]-sulfamide
N-ethyl-N-[1-methyl-2-(3-trifluoromethylphenyl)ethyl]sulfamide
N-(2-methyl-2-phenylethyl)sulfamide The above sulfamide compounds can be found in U.S. Pat. No. 3,143,549 and the carbamides are disclosed in C.A. 53:15347$^d$.

The ability of the phenylalkylsulfamide and urea derivatives of this invention to increase feed intake of both monogastric and ruminant animals has been established by the following tests:

MONOGASTRIC — RAT EXPERIMENTS

Charles River Rat Chow in meal form was fed to rats in metabolism cages equipped with feeding tunnels for accurate measurement of feed intake. Rats are housed in a temperature controlled room at about 22° C. Test compounds are administered twice daily by stomach tube in a carrier solution containing 95% of a 0.75% aqueous solution of methyl cellulose and 5% polyethylene glycol. Control rats receive only the carrier solution. Feed intakes are measured for four consecutive days and the results are presented as the mean four day intake of the treatment group as a percent of the control group intake.

RUMINANTS — SHEEP EXPERIMENTS

Two-Day Tests

Healthy sheep in individual cages were fed ad libitum a 60% concentrate - 40% hay diet in meal form. All animals were fed the basal diet during a two day control period, the basal diet plus the test compound for 2 days, then the basal diet alone for 2 additional days. Feed intakes were measured daily for the entire 6-day period. Results are presented as the average 2-day intakes during the treatment period as a percentage of the average 2-day pretreatment control intake.

Twenty-Eight Day Tests

Healthy sheep were fed the same diet and housed in individual cages as in the two-day tests previously described. Prior to the start of the 28-day tests, the sheep were adapted to the feed, cages and environment for at least three weeks. During a preliminary period of one week, all sheep received the basal diet. For the following four weeks a control group was continued on the basal diet; treated groups received the test chemical at varying dose rates expressed as mg./kg. of basal diet. Daily feed intakes were measured and sheep were weighed at weekly intervals. Results are presented as intakes of the treatment groups as a percent of control group intakes.

Intraruminal and Intra-abomasal Tests

Healthy sheep with ruminal or abomasal cannulas were fed ad libitum a 60% concentrate - 40% hay pelleted diet. The test chemical was administered in a carrier solution (95% of 0.75% aqueous methyl cellulose, 5% polyethylene glycol) by intraruminal or intra-abomasal injection during spontaneous meals. Carrier solution was injected during a pretreatment, two-day control period. On the following two days, carrier plus chemical was injected and this was followed by two days of carrier injection. Values presented are average intakes during the two-day treatment period as a percent of intake during the two-day pretreatment control period.

Intravenous

One hour after fresh feed was given, healthy sheep were injected in the jugular vein with the active ingredient in 10 ml. of a 25% alcohol carrier solution. Feed intakes were measured at 15, 30, and 60 minutes after injection and then compared to an average after injection of the carrier solution alone.

Third Ventricular Injections

Healthy sheep were surgically prepared with cannula guide tubes directed toward the third ventricle of the brain. The guides were positioned with the aid of X-Ray identification of certain bony structures and were rigidly fixed to the skull. The sheep were fed the same pelleted diet as in the previously described experiments. Between test periods stylets were placed in the cannulas. In preparation for injections, stylets were withdrawn and replaced with cannulas inserted into the third ventricle through the guide tubes. Sheep were injected on test day 1 with a carrier solution and on test day 2 with carrier solution plus chemical. Feed intakes were measured at 30 and 60 minutes after injection. Values presented are intakes on treatment days as a percent of intake on control days.

Table I represents the results of these tests performed with N-[1-methyl-2-(3-trifluoromethylphenyl)ethyl]-sulfamide as the active ingredient.

Table I

| No. Animals | Species | No. Days Tested | Method | Dose | % of Control |
|---|---|---|---|---|---|
| 10 | Rat | 4 | Intubation | 1.38 mg/day | 106 |
| 10 | Rat | 4 | Intubation | 2.75 mg/day | 104 |
| 10 | Rat | 4 | Intubation | 5.50 mg/day | 107 |
| 8 | Sheep | 2 | Feed | 63 mg/kg | 104 |
| 8 | Sheep | 2 | Feed | 125 mg/kg | 96 |
| 8 | Sheep | 2 | Feed | 225 mg/kg | 108 |
| 16 | Sheep | 2 | Feed | 250 mg/kg | 112 |
| 10 | Sheep | 28 | Feed | 200 mg/kg | 106 |
| 10 | Sheep | 14 | Feed | 270 mg/kg | 98 |
| 12 | Sheep | 2 | Intraruminal | 261 mg/day | 109 |
| 5 | Sheep | 2 | Intra-abomasal | 140 mg/day | 105 |
| 12 | Sheep | 2 | Intra-abomasal | 280 mg/day | 107 |
| 8 | Sheep | 1 hr. | Intravenous | 100 mg/day | 200 |
| 14 | Sheep | 1 hr. | Intraventricular | 250 μg | 250 |
| 7 | Sheep | 1 hr. | Intraventricular | 500 μg | 300 |

These results clearly indicate that both monogastric and ruminant animals eat significantly more feed after being administered a phenylalkylsulfamide.

We claim:
1. The method of increasing feed intake and efficiency of healthy ruminant animals comprising administering internally to said animals not in need of therapeutic treatment an effective but nontoxic quantity of a phenylalkylsulfamide or phenylalkylurea compound of the formula:

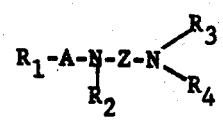

in which:
R$_1$ is phenyl, chlorophenyl, bromophenyl, fluorophenyl, nitrophenyl, or trifluoromethylphenyl;
A is a lower alkylene having from 2 to 4 carbon atoms;
R$_2$, R$_3$, R$_4$ are hydrogen or lower alkyl having from 1 to 6 carbon atoms; and
Z is SO$_2$ or CO.

2. The method of claim 1 in which the phenylalkylsulfamide or urea compound is present in ruminant feed compositions in an amount of from about 10 g. to 1 kg. per ton of feed.

3. The method of claim 2 in which the quantity of phenylalkylsulfamide or urea compound is present from about 25 g. to about 300 g. per ton of feed.

4. The method of claim 1 in which the quantity of phenylalkylsulfamide or urea compound administered is from about 25 mg. to 5.0 g. per animal per day.

5. The method of claim 1 in which the phenylalkylsulfamide or urea compound is administered intramuscularly as implant pellets.

6. The method of claim 1 in which the compound is a phenylalkylsulfamide.

7. The method of claim 6 in which the phenylalkylsulfamide is N-[1-methyl-2-(3-trifluoromethylphenyl)ethyl]-sulfamide.

8. The method of claim 6 in which the phenylalkylsulfamide is N-[1,2-dimethyl-2-(3-trifluoromethylphenyl)-ethyl]sulfamide.

9. The method of claim 1 in which the phenylalkylurea compound is 1-(m-trifluoromethylphenyl)-2-ureidopropane.

* * * * *